United States Patent
Joko et al.

(10) Patent No.: US 11,578,521 B2
(45) Date of Patent: Feb. 14, 2023

(54) OPENING AND CLOSING BODY DRIVE MECHANISM

(71) Applicant: HI-LEX CORPORATION, Takarazuka (JP)

(72) Inventors: Atsushi Joko, Takarazuka (JP); Ken-ichi Fujiwara, Takarazuka (JP)

(73) Assignee: HI-LEX CORPORATION, Takarazuka (JP)

(*) Notice: Subject to any disclaimer, the term of this patent is extended or adjusted under 35 U.S.C. 154(b) by 0 days.

(21) Appl. No.: 17/004,532

(22) Filed: Aug. 27, 2020

(65) Prior Publication Data
US 2021/0062565 A1  Mar. 4, 2021

(30) Foreign Application Priority Data
Aug. 29, 2019  (JP) .............................. JP2019-157208

(51) Int. Cl.
*E05F 15/40* (2015.01)
*E05F 15/60* (2015.01)
*B60J 5/10* (2006.01)

(52) U.S. Cl.
CPC .............. *E05F 15/40* (2015.01); *B60J 5/102* (2013.01); *B60J 5/106* (2013.01); *E05F 15/60* (2015.01); *E05Y 2201/434* (2013.01); *E05Y 2400/32* (2013.01); *E05Y 2400/36* (2013.01); *E05Y 2400/44* (2013.01); *E05Y 2400/512* (2013.01); *E05Y 2400/514* (2013.01); *E05Y 2900/546* (2013.01)

(58) Field of Classification Search
None
See application file for complete search history.

(56) References Cited

U.S. PATENT DOCUMENTS

| 6,729,071 | B1* | 5/2004 | Kawanobe | E05F 15/646 |
| | | | | 49/360 |
| 6,825,623 | B2* | 11/2004 | Onozawa | E05F 15/40 |
| | | | | 318/257 |
| 7,073,291 | B2* | 7/2006 | Kawanobe | E05F 15/646 |
| | | | | 318/280 |
| 10,626,660 | B2* | 4/2020 | Ikenori | E05F 15/611 |
| 2003/0018419 | A1* | 1/2003 | Zhou | G05B 19/0428 |
| | | | | 701/36 |
| 2004/0267425 | A1* | 12/2004 | Suzuki | E05F 15/632 |
| | | | | 701/49 |
| 2012/0323370 | A1* | 12/2012 | Nishikibe | E05F 15/40 |
| | | | | 700/275 |

FOREIGN PATENT DOCUMENTS

JP   2009138330 A   6/2009

* cited by examiner

*Primary Examiner* — Gregory J Strimbu
(74) *Attorney, Agent, or Firm* — Greer Burns & Crain Ltd.

(57) ABSTRACT

An opening and closing body drive mechanism that drives an opening and closing body between an open position and a closed position; a drive unit to drive the opening and closing body; a detecting unit to detect movement of the opening and closing body; and a control unit to control driving of the opening and closing body. The control unit carries out a feedback control to control driving of the opening and closing body such that the movement of the opening and closing body, detected with the detecting unit, matches a predetermined target value when no abnormality occurs in the detecting unit or in wiring connecting the detecting unit and the control unit.

6 Claims, 5 Drawing Sheets

OPENING AND CLOSING BODY DRIVE MECHANISM

TECHNICAL FIELD

The invention relates to an opening/closing body drive mechanism.

BACKGROUND OF THE INVENTION

For automatic control for opening/closing of an opening/closing body, for example, a door or a tail gate of an automobile whose movement is automatically controlled by an electronic control unit, a sensor to detect the position of the door, for example, is used.

An automatic opening/closing system comprising a control unit to control movement of an opening/closing body based on the output of such a sensor and a motor to actually move a door or the like based on control of the control unit is being commercialized (see JP 2009-138330 A, for example).

SUMMARY OF THE INVENTION

However, with the system in JP 2009-138330 A, whether abnormality occurs in a sensor is determined with an opening/closing body being stationary when the driving force of a motor is absorbed by an elastic deforming portion of a driving force transmission mechanism. Therefore, even in a situation that the opening/closing body is stationary, detection separately requires the elastic deforming portion as a component. Moreover, in a case that abnormality occurs with information from the sensor, such as a failure of the sensor, in the middle of an opening/closing operation of a door, the abnormality cannot be detected until the opening/closing body moves to the fully closed position. Then, in a case that a control unit carries out a feedback control on movement of the opening/closing body such that the speed of movement of the opening/closing body is brought to be the target speed, the feedback control is to be carried out based on the abnormal information. In other words, until the opening/closing body moves to the fully closed position, an inappropriate control such as movement of the door at an excessive speed, for example, is carried out. Therefore, the system needs to be used with sufficient attention given to safety, such as not to move close to the opening/closing body at the time of opening/closing the opening/closing body.

Thus, an object of the invention is to provide an opening/closing body drive mechanism that makes it possible to easily determine abnormality with respect to a sensor.

An opening/closing body drive mechanism according to the invention comprises: an opening/closing body to move between an open position to open an opening being provided to an mounting object and a closed position to close the opening; a drive unit to drive the opening/closing body; a detecting unit to detect the movement state of the opening/closing body; and a control unit to control driving for the opening/closing body by the drive unit based on an output of the detecting unit, wherein a feedback control to control the driving is carried out such that a physical value being detected with the detecting unit is brought to be a target value being set in advance; and, in a case that information from the detecting unit differs from predetermined information according to the feedback control and a control value given to the drive unit exceeds a predetermined threshold value, it is determined that the information from the detecting unit is abnormal.

The opening/closing body drive mechanism according to the invention makes it possible to easily determine abnormality with respect to a sensor.

DETAILED DESCRIPTION

Below, with reference to the drawings, an opening/closing body drive mechanism according to an embodiment of the invention is described. The embodiment shown below is merely an example, so that the opening/closing body drive mechanism according to the invention is not limited to the embodiment below.

[Overall Configuration of Opening/Closing Body Drive Mechanism]

Figure 1:
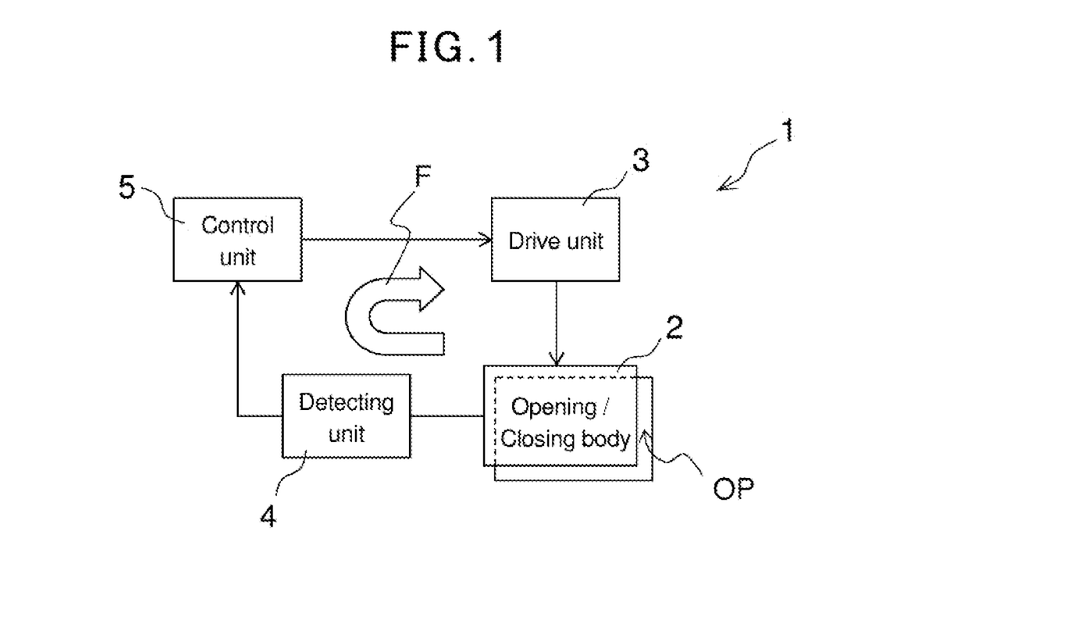
FIG. 1 is a block diagram illustrating the configuration of an opening/closing body drive mechanism according to an embodiment of the invention.
Figure 2A:
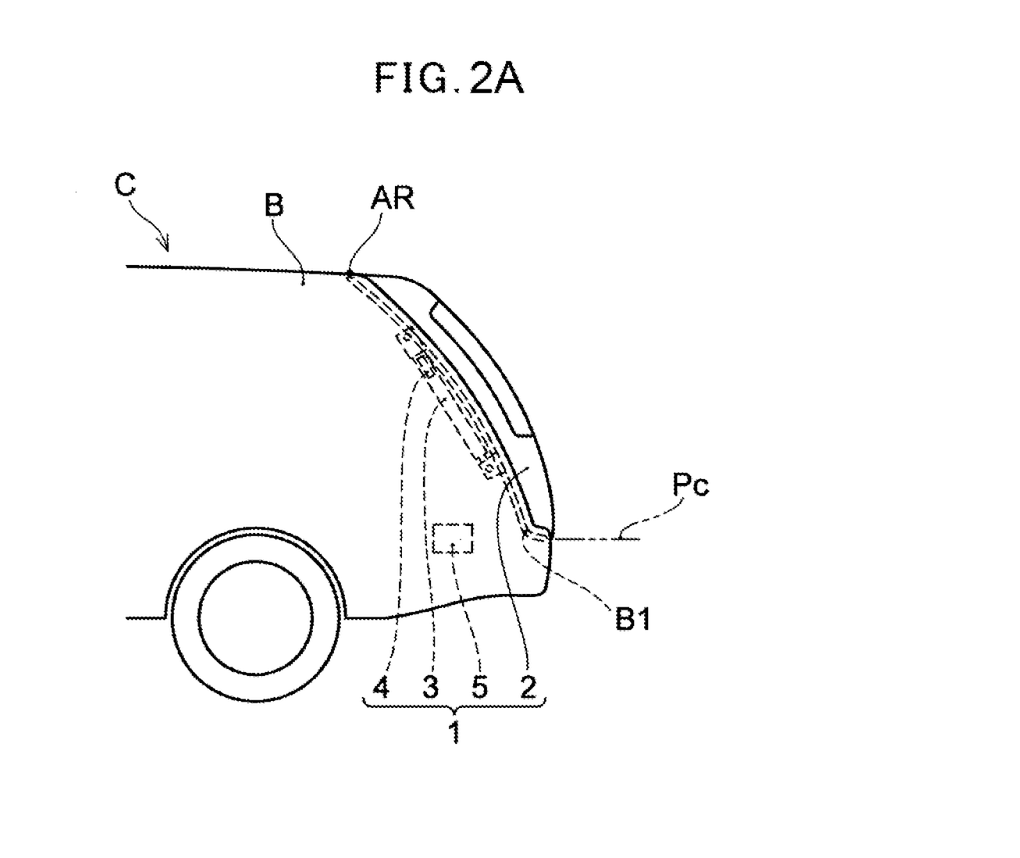
FIG. 2A is a diagram illustrating the state in which the rear door of an automobile comprising the opening/closing body drive mechanism according to an embodiment of the invention is being in the closed position.
Figure 2B:
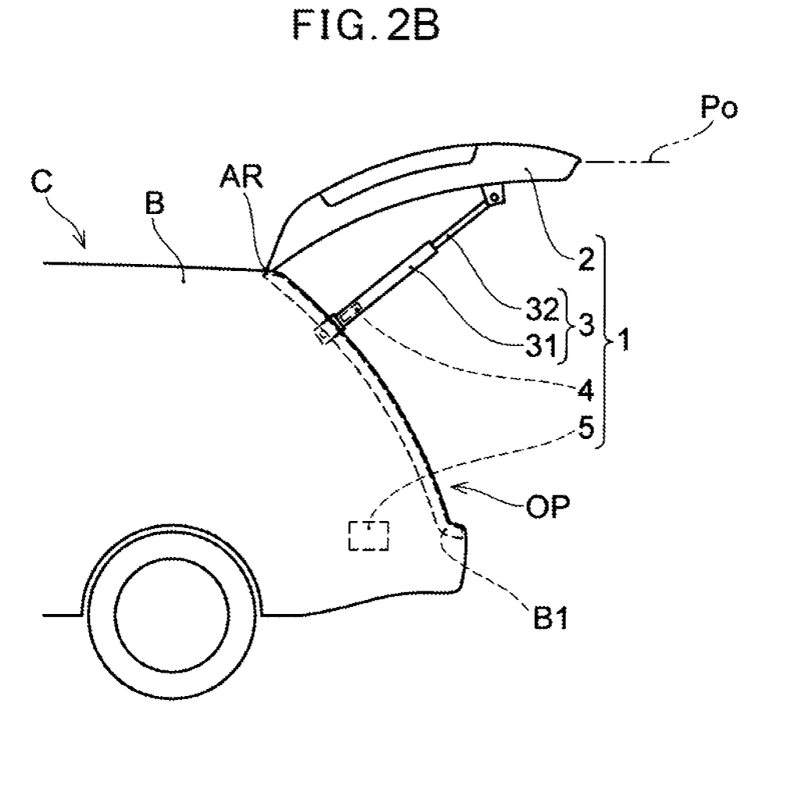
FIG. 2B is a diagram illustrating the state in which the rear door of the automobile comprising the opening/closing body drive mechanism according to an embodiment of the invention is being in the open position.

FIG. 1 is a block diagram showing the configuration of an opening/closing body drive mechanism according to one embodiment in conjunction with an opening to be opened/closed using the opening/closing body drive mechanism. Moreover, FIGS. 2A and 2B show a rear portion of an automobile comprising the opening/closing body drive mechanism as a drive mechanism for a tailgate (the door at the back of a vehicle). FIG. 2A shows the state in which the tailgate is in the closed position, and FIG. 2B shows the state in which the tailgate is in the open position. While FIGS. 2A and 2B show application examples of the opening/closing body drive mechanism to the tailgate of the automobile, the use of the opening/closing body drive mechanism is not limited to the drive mechanism for the tailgate as described below.

As shown in FIG. 1, an opening/closing drive mechanism 1 according to the present embodiment comprises an opening/closing body 2, a drive unit 3 to drive the opening/closing body 2, a detecting unit 4 to detect the movement state of the opening/closing body 2, and a control unit 5 to control driving for the opening/closing body 2 by the drive unit 3 based on the output of the detecting unit 4. The opening/closing body 2 is mounted to an mounting object in a state which the opening/closing body 2 is movable. The opening/closing body 2 moves between an open position Po to open an opening OP being provided to the mounting object and a closed position Pc to close the opening OP.

[Opening/Closing Body]

The opening/closing body 2 moves between the open position and the closed position of the opening OP to switch between the open state and the closed state of the opening OP. In the present embodiment, the opening/closing body 2 is the tailgate of the automobile. The opening/closing body 2 can be a door or a window of the automobile other than the tailgate, or, a door (a hinged door), a sliding door, a shutter, window opening/closing fittings, or window glass which are provided in a house. In the present embodiment, the mounting object of the opening/closing body 2 is an opening edge at the rear of a vehicle. The mounting object to which the opening/closing body 2 is to be mounted is not particularly limited as long as the opening/closing body 2 can be movably mounted thereto and it has the opening OP to be opened/closed by the opening/closing body 2. For example, the mounting object of the opening/closing body 2 can be a window frame or a door frame of a moving body such as the automobile, or a building, and the opening OP can be a space in a region surrounded by the window frame or the door frame of the moving body such as the automobile, or the building. The opening OP can have an arbitrary shape such as substantially rectangular, circular, or elliptical.

The specific structure, material, and shape of the opening/closing body 2 are not particularly limited as long as the opening/closing body 2 can move between the open position and the closed position. "The open state" and "the closed state" of the opening/closing body 2 are not limited to the state in which the opening OP is completely opened or to the state in which the opening OP is completely closed, so that "the open state" and "the closed state" mean an open state and a closed state in which an object of the opening/closing body 2 can be achieved in accordance with the object of the opening/closing body 2. For example, in a case that the object of the opening/closing body 2 is to suppress movement of a physical body from the interior to the exterior via an opening, even the state in which there is a gap between the opening/closing body 2 and the mounting object can be "the closed state" unless the physical body moves to the exterior via the opening. Similarly, as long as "the open position" and "closed position" are positions which can be brought to be in the states according to objects of the opening/closing body 2, "the open position" and "closed position" do not have to be positions at which the opening/closing body 2 brings the opening to be completely in the open state or brings the opening to be completely in the closed state.

[Drive Unit]

The drive unit 3 causes the opening/closing body 2 to move between the open position and the closed position. Movement of the opening/closing body 2 caused by the drive unit 3 can be such that a predetermined part of the opening/closing body 2 moves with a straight line or a curved line being drawn, or can be such that the opening/closing body 2 rotates. The drive unit 3 drives to move the opening/closing body 2. For example, the drive unit 3 can use a drive apparatus comprising a motor driving based on a predetermined signal. The drive unit 3 is not particularly limited with respect to a drive scheme as long as it can cause the opening/closing body 2 to move between the open position and the closed position.

[Detecting Unit]

The detecting unit 4 detects the movement state of the opening/closing body 2. The detecting unit 4 outputs detection results on the detected movement state of the opening/closing body 2 to the control unit 5. The detecting unit 4 can directly detect the movement state of the opening/closing body 2 or can indirectly detect the movement state of the opening/closing body 2. In other words, the detecting unit 4 can detect movement of the opening/closing body 2 itself or can detect the movement state of the opening/closing body 2 via an operation of the drive unit 3 (an operation of a constituting member of the drive unit 3, for example).

To detect the movement state of the opening/closing body 2, the detecting unit 4 detects information related to movement, such as the position or speed at a predetermined time. From obtained detection results (the speed of the opening/closing body 2, for example), the detecting unit 4 can derive another element indicating the movement state (the present position of the opening/closing body 2, for example) or output direct detection results to the control unit 5. In the control unit 5, another element indicating the movement state (the position of the opening/closing body 2, for example) can also be derived based on the detection results obtained from the detecting unit 4 (the speed of the opening/closing body 2, for example).

The detection scheme of the detecting unit 4 is not particularly limited as long as it can detect the movement state of the opening/closing body 2. The detecting unit 4 can carry out the detection using any detection scheme being electrical, magnetic, or optical, for example. The detecting unit 4 can be configured with a displacement sensor, a speed sensor, or the number-of-rotations counter according to an arbitrary detection scheme.

[Control Unit]

The control unit 5 controls movement of the opening/closing body 2 by the drive unit 3 based on the output of the detecting unit 4. The constituting elements of the control unit 5 are not particularly limited as long as the control unit 5 can control the movement of the opening/closing body 2.

According to the present embodiment, the control unit 5 carries out a feedback control F to control driving for the opening/closing body 2 by comparing a target moving speed specifying the moving speed to be a target for the opening/closing body 2 and an actual moving speed of the opening/closing body 2, the actual moving speed being obtained based on the information from the detecting unit 4. "The target moving speed" can be the speed at which the opening/closing body 2 moves, the speed being set in accordance with the position.

In the feedback control F, the control unit 5 determines the moving speed of the opening/closing body 2 based on information obtained from the detecting unit 4, for example, information on the position of the opening/closing body 2. The target moving speed is specified in advance in correspondence with the position of the opening/closing body 2. The control unit 5 can determine the target moving speed based on the information being actually obtained from the detecting unit 4 by referring to the storage content corresponding to the present position of the opening/closing body 2 being obtained from the detecting unit 4. The control unit 5 can determine the target moving speed based on the information being actually obtained from the detecting unit 4 by carrying out the control using the information obtained from the detecting unit 4 based on a target moving speed schedule specifying the relationship between the position and the target speed.

The control unit 5 compares the target moving speed being determined based on the information from the detecting unit 4 and the actual moving speed, of the opening/closing body 2, being obtained from the detecting unit 4 to carry out the feedback control F such that the actual moving speed of the opening/closing body 2 is brought to be the target moving speed determined based on the information from the detecting unit 4.

For the feedback control F, a PI control can be carried out. The PI control is the control in which a proportional operation to change a control value to be given to the drive unit 3 in proportion to the deviation between the target moving speed and the actual moving speed of the opening/closing body 2 and an integration operation to change a control value in proportion to the integration of the above-mentioned deviation are combined. A control value being suitable to move the opening/closing body 2 with the target moving speed being determined based on the information from the detecting unit 4 through the feedback control F by the control unit 5 is given to the drive unit 3. The feedback control F is not limited to the PI control, so that it can be a P control to carry out only the previously-described proportional operation, or a PID control in which a differential operation is further added to the PI control, or a control other than these controls, for example. The feedback control F causes the moving speed of the opening/closing body 2 to be controlled to the target moving speed being determined based on the information from the detecting unit 4. While in the present embodiment, a control is carried out by comparing the target moving speed of the opening/closing body 2 and the actual moving speed of the opening/closing body 2 being obtained from the detecting unit 4, a control can be carried out using a physical quantity, such as a current value, which is measurable and capable to representing the movement state or the driving state of the opening/closing body 2. The control value that can be used for the above-mentioned control can be grasped as a physical value, including the physical quantity, which indicates a physical property. Moreover, a part to measure the movement state or the driving state of the opening/closing body 2 is not limited to the detecting unit 4, so that it can be another part or it can be a plurality of parts. For example, a current value to drive the opening/closing body 2 is measured with the control unit 5, and a feedback control is carried out with this physical quantity. In this way, an abnormality is determined when the expected movement amount of the opening/closing body 2 by the driving cannot be obtained from the detecting unit 4 and the control value is greater than or equal to or less than or equal to a predetermined threshold value. The threshold value to be used for determining the abnormality is appropriately set in accordance with an object of the feedback control, so that a case in which a predetermined different value is obtained with respect to the magnitude relationship with the feedback control value given to the drive unit 3 can be set to be a case in which the control value given to the drive unit 3 exceeds the predetermined threshold value. As for control of abnormality determination, while a determination time needs to be allocated sufficiently to ensure that an erroneous detection does not occur with a normal operation with a scheme to carry out a determination with only the movement amount, the feedback control value can be taken into consideration in this way to shorten or eliminate the determination time to easily determine the abnormal state.

According to the present embodiment, in a case that the information from the detecting unit 4 differs from predetermined information according to the feedback control F and the control value given to the drive unit 3 exceeds a predetermined threshold value, the control unit 5 determines that the information from the detecting unit 4 is abnormal. In other words, the presence/absence of abnormality of the information of the detecting unit 4 is determined using the information being obtained from the detecting unit 4 and predetermined information to be obtained through the feedback control F, and the control value given to the drive unit 3 in the feedback control F and the predetermined threshold value with respect to the control value.

The abnormality of the information from the detecting unit 4 can be determined based on information input to the control unit 5 and the output value from the control unit 5 in the feedback control F. According to the present embodiment, even when the opening/closing body 2 is moving, the presence/absence of abnormality of the information from the detecting unit 4 can be determined. In a case that the actual moving speed does not reach the target moving speed at the present position or exceeds the target moving speed, the control unit 5 changes driving of the drive unit 3 such that the actual moving speed of the opening/closing body 2 is brought to be the target moving speed.

"The predetermined threshold value" is set in accordance with the type or the use of the opening/closing body for the control unit 5 to determine whether the information from the detecting unit 4 is abnormal. The predetermined threshold value can be set as a difference between a value from which movement of the opening/closing body by the drive unit 3 driving with a control amount given from the control unit 5 is detected as the information from the detecting unit 4 and an expected value in the abnormal state of the detecting unit 4. For example, when an information value being actually obtained from the detecting unit 4 deviates from an information value from the detecting unit 4 to be obtained by the control amount being given to the drive unit 3 by the control unit 5, by at least a predetermined value beyond an error despite that a voltage for the opening/closing body 2 to move with a predetermined speed is given to the drive unit 3 from the control unit 5, the detecting unit 4 is likely to be abnormal. Therefore, a value with which the detecting unit 4 can be determined to be abnormal can be set as a predetermined threshold value. In a case that the information from the detecting unit 4 differs from predetermined information according to the feedback control F, the control unit 5 seeks to change the drive amount of the drive unit 3 by giving a control amount more than necessary to the drive unit 3. In such a case, if the information value which should be obtained by the control amount being given to the drive unit 3 by the control unit 5 cannot be obtained from the detecting unit 4, the control unit 5 controls the drive unit 3, seeking to change the drive amount of the drive unit 3, so that abnormal driving occurs in the opening/closing body 2, ending up by giving anxiety to the surrounding observer. The above-described control amount to be given to the drive unit 3 by the control unit 5 can be set as a substitute numerical value (a control value). While the control amount in the above-described example is a voltage, driving can be easily carried out with the control value as a magnitude of the voltage by controlling the duty ratio using PWM (Pulse Width Modulation) control, for example.

The type of control value to be given to the drive unit 3 is a value related to a specific physical quantity to be selected in accordance with the operational format of the drive unit 3. The control value can be an electrical, an optical, or a mechanical physical quantity. For example, while voltage, current, frequency, luminosity, and pressure can be exemplified as the control value, the type of control value is not particularly limited as long as the drive unit 3 can be controlled with the control value.

As shown in FIGS. 2A and 2B, the opening/closing body drive mechanism 1 according to the present embodiment can be used as a drive mechanism for a tailgate of an automobile. In the examples in FIGS. 2A and 2B, the opening/closing body 2 of the opening/closing body drive mechanism 1 is a tailgate of an automobile C. A vehicular body B of the automobile C is an mounting object for the opening/closing body 2 and an opening portion to be an opening provided in the vehicular body B and to be opened/closed by the tailgate 2 is the opening OP.

In the examples in FIGS. 2A and 2B, an upper side portion of the opening/closing body 2 (the tailgate) is pivotably mounted to the upper edge side of the opening OP via an axial portion AR being a hinge. The opening/closing body 2 causes the opening OP to be in an open state or a closed state by pivoting around the axial portion AR to cause the lower side portion side thereof to move upward/downward.

In the examples in FIGS. 2A and 2B, the drive unit 3 causes the opening/closing body 2 to move between the open position Po and the closed position Pc by extension/contraction driving. In the examples in FIGS. 2A and 2B, the one drive unit 3 is provided to each of edges of the opening/closing body 2 and the opening OP in the vehicle width direction, so that two drive units 3 are provided in total. The drive unit 3 according to the present embodiment can be provided in a plurality for one opening OP. Each of the drive units 3 operates to cause the opening/closing body 2 to move relatively with respect to the opening OP, switching the open state and the closed state of the opening OP.

The drive unit 3 is connected to the external periphery of the opening OP of the vehicular body B at one end and is connected to the opening/closing body 2 at the other end. The drive unit 3 comprises a main body portion 31 to be connected to the vehicular body B as the one end side and an advancing/receding portion 32 to be connected to the opening/closing body 2 as the other end. The main body portion 31 has a cylindrical form, while the advancing/receding portion 32 is provided to the main body portion 31 so as to be capable of going out from and going down to the other end side of the main body portion 31.

More specifically, the drive unit 3 comprises a motor (not shown), a spindle (not shown), and an energizing member (not shown) in the main body portion 31, and an advancing/receding portion is connected to a nut (not shown) being provided at the outer periphery of the spindle. By being activated, the motor causes the advancing/receding portion 32 to move in the longitudinal direction with respect to the main body portion 31 to extend/contract the drive unit 3. While the motor to function as a driving source of the drive unit 3 can be either one of a DC motor and an AC motor, in a case that the opening/closing body drive mechanism 1 is used in an automobile as shown in the example in FIGS. 2A and 2B, it is preferable to utilize the DC motor that can utilize a DC power supply of the automobile.

The advancing/receding portion 32 is energized from one end side toward the other end side of the drive unit 3 by the previously-described energizing member. The previously-described nut is fixed in advancing/receding portion 32 by screwing with previously-described spindle. The spindle is provided in the main body portion 31 and rotates around the drive shaft of the motor by rotating of the motor. The drive unit 3 is further provided with a rotation preventing member (not shown) to prevent corotation of the advancing/receding portion 32 by rotating of the spindle. The rotation preventing member is a cylindrical body comprising a groove extending in the axial direction in the inner wall thereof, for example. Corotation of the spindle and the nut is prevented by the rotation preventing member, so that, when the spindle rotates in conjunction with driving of the motor, the advancing/receding portion 32 moves along the axial direction of the spindle. The advancing/receding portion 32 advances from the main body portion 31 in one of normal rotation and reverse rotation of the motor and recedes into the main body portion 31 in the other one of the normal rotation and the reverse rotation. As a result, the drive unit 3 extends or contracts. The motor to rotate the spindle is connected to the control unit 5 and extending/contracting of the drive unit 3 is controlled by the control unit 5.

The drive unit 3 is connected to each of the opening/closing body 2 and the vehicular body B via a connection mechanism (for example, a ball joint) that can change the connection direction in accordance with extending/contracting of the drive unit 3. The drive unit 3 extends or contracts to cause the opening/closing body 2 to undergo a pivoting movement and a relative movement with respect to the opening OP between the closed position Pc (the position to completely close the opening OP, for example) and the open position Po (the position to open the opening OP the greatest, for example). The motor to move the advancing/receding portion 32 of the drive unit 3 rotating once causes the advancing/receding portion 32 to move by the length of one pitch of thread being engraved on the spindle, for example. Therefore, the rotational speed and the number of rotations of the motor provided in the drive unit 3 correspond to the moving speed and the moving distance of the opening/closing body 2, respectively.

At the periphery of the opening OP of the vehicular body B, a sealing member B1 is provided along the edge of the opening OP. The sealing member B1 is positioned between the opening/closing body 2 and the vehicular body B when the opening/closing body 2 is positioned at the closed position Pc. The sealing member B1 being an elastic member such as rubber, for example, is pressed onto the vehicular body B by the opening/closing body 2 being positioned at the closed position Pc. Therefore, as shown in FIG. 2A, when the opening/closing body 2 is positioned at the closed position Pc, the sealing member B1 is compressed by the opening/closing body 2, improving the sealability at the opening OP.

In the examples in FIGS. 2A and 2B, the detecting unit 4 is provided in the main body portion 31 of the drive unit 3. The detecting unit 4 comprises a magnet being provided to move with rotating of the drive shaft of a motor being provided in the main body portion 31 of the drive unit 3 and a Hall element to detect the magnetic field generated by the magnet. For example, the magnet is arranged in the drive shaft of the motor, or in a member to rotate with the drive shaft. The Hall element is arranged at a position that can face the magnet at a predetermined rotation angle, the magnet to revolve around the drive shaft in conjunction with driving of the motor. The Hall element is arranged at the surrounding of the drive shaft, for example, on an inner wall of the cylindrical main body portion 31 and outputs a pulse signal in conjunction with movement of the magnet.

Only one Hall element can be arranged, or a plurality of Hall elements, such as two, or three or more, can be arranged. In a case that the plurality of Hall elements is arranged, each of the Hall elements outputs a pulse signal in conjunction with driving of the motor. For example, arranging two of the Hall elements at a position of a plane being orthogonal to the drive shaft of the motor, the position being asymmetrical with respect to the drive shaft, makes it possible to detect the rotating direction of the drive shaft, or, in other words, the moving direction of the opening/closing body 2. For example, the two Hall elements are arranged so as to output pulse signals with phases being shifted from each other by 90°.

The Hall element making up the detecting unit 4 outputs a pulse signal having a frequency being equal to the number of rotations for each second of the drive shaft of the motor. In other words, the output of the Hall element includes information on the moving speed of the opening/closing body 2. An output signal of the Hall element is sent to the control unit 5. The control unit 5 can obtain the moving speed of the opening/closing body 2 through information from the Hall element.

Moreover, the control unit 5 can obtain the moving distance of the opening/closing body by a calculation based on time in which the motor is driven, or, in other words, a count of time in which the drive unit 3 is driven. In other words, the moving distance can be calculated from a pulse count value after moving of the opening/closing body 2 relative to a pulse count value before moving of the opening/closing body 2, and further, the moving speed can be calculated by dividing the moving distance by the time required for moving. Counting of the driving time of the drive unit 3 and calculating of the position of the opening/closing body 2 can be carried out by the detecting unit 4 and calculation results can be sent to the control unit 5.

In the examples in FIGS. 2A and 2B, the control unit 5 is arranged at an arbitrary position of the vehicular body B. The control unit 5 can be arranged in the rear of the automobile C so as not to occur a delay in transmitting a signal between the drive unit 3 and the detecting unit 4, for example. Moreover, the control unit 5 can be arranged adjacent to the drive unit 3. The control unit 5 can be integrated into an electronic control unit to control each function provided to the automobile C or can be configured in the interior of the main body portion 31 or the advancing/receding portion 32 making up the drive unit 3.

The control unit 5 can provide a voltage as a control value for the drive unit 3 to drive the opening/closing body 2 with a motor. The voltage as the control value can be a DC voltage or an AC voltage (an effective value or a maximum value, for example). Moreover, in a case that the motor of the drive unit 3 is controlled by PWM (Pulse Width Modulation), the voltage to be provided as the control value can be the average voltage of a voltage pulse to be input to the drive unit 3.

[Control in Opening/Closing Body Drive Mechanism]

Figure 3:
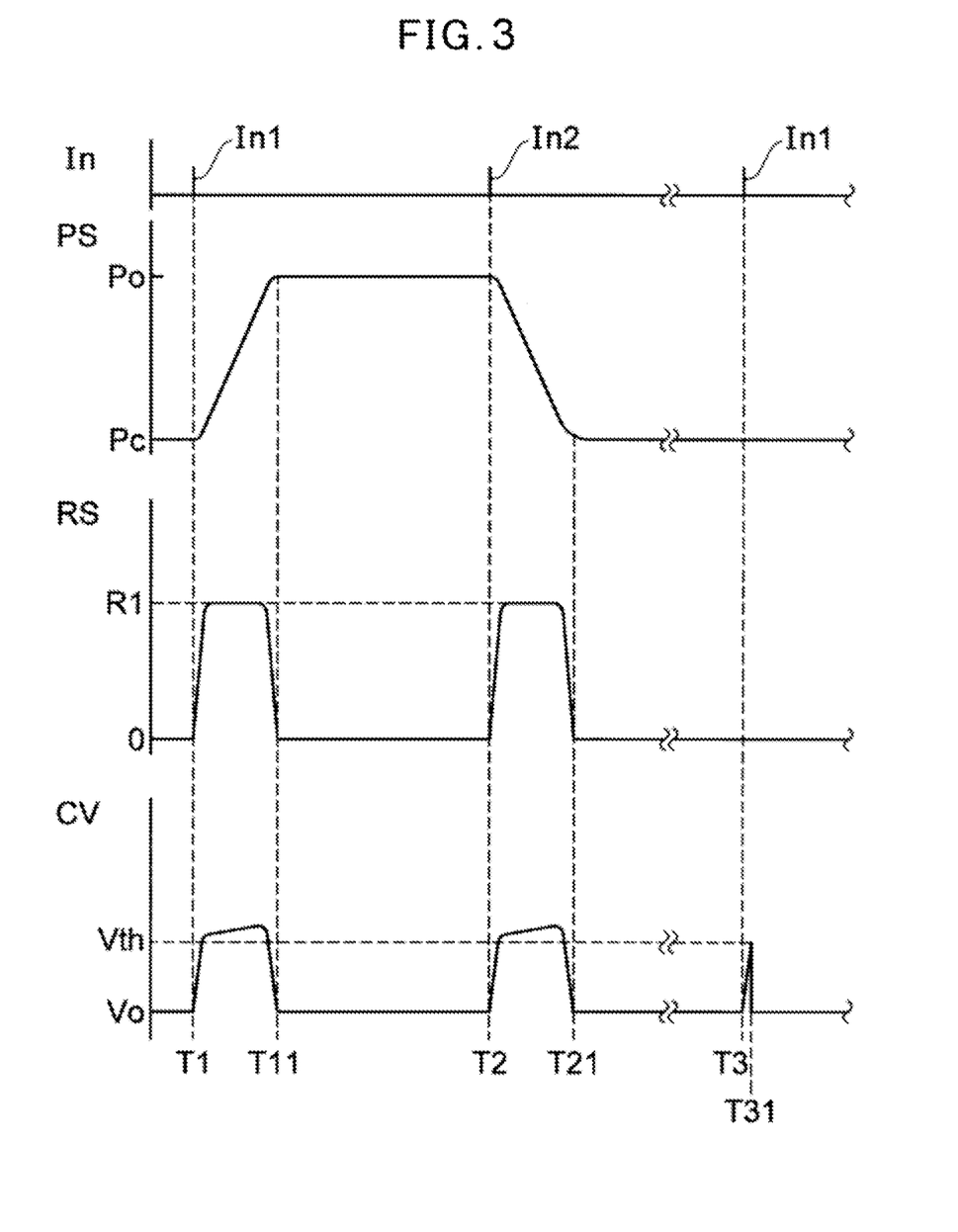
FIG. 3 is a diagram illustrating an example of control and abnormality determination by the opening/closing body drive mechanism according to an embodiment of the invention.

With reference to FIG. 3, control of the opening/closing body 2 and abnormality determination on information from the detecting unit 4 in the opening/closing body drive mechanism 1 according to the present embodiment will be described in further detail. FIG. 3 shows, in a timing chart format, an example of control by the opening/closing body drive mechanism 1 in the examples in FIGS. 2A and 2B.

In the example in FIG. 3, the chart in the topmost stage conceptually shows an instruction In to be input to the opening/closing body drive mechanism 1, in which chart an opening instruction In1 which instructs the opening/closing body drive mechanism 1 that the opening/closing body 2 is turned into an open state, and a closing instruction In2 which instructs the opening/closing body drive mechanism 1 that the opening/closing body 2 is turned into a close state. The opening instruction In1 and the closing instruction In2 are input by the user of the automobile C operating an operating switch of the opening/closing body 2 (a tailgate), for example. In the example in FIG. 3, the opening instruction In1 is input at a time point T1 and a time point T3, while the closing instruction In2 is input at a time point T2.

In FIG. 3, charts in the second and third stages from the top show a position PS and a moving speed RS, respectively, of the opening/closing body 2. Each of the position PS and the moving speed RS is obtained by the information from the detecting unit 4. In a case that the detecting unit 4 operates normally, the chart PS and the chart RS show the position and the moving speed, respectively, being substantially the same as the actual position and the actual moving speed of the opening/closing body 2. The chart in the bottommost stage in FIG. 3 shows a control value CV to be given from the control unit 5 to the drive unit 3. In the example in FIG. 3, the voltage is provided for the drive unit 3 as the control value CV.

In the example in FIG. 3, the opening/closing body 2 stops at the closed position Pc up to the time point T1 and the position PS and the moving speed RS of the opening/closing body 2 to be obtained from the detecting unit 4 normally operating also indicate the closed position Pc and zero speed, respectively. The control unit 5 provides, for the drive unit 3 as the control value CV, a voltage Vo being a control value that does not move the opening/closing body 2.

When the opening instruction In1 is input at the time point T1, the control unit 5 increases the control value CV from Vo to move the opening/closing body 2 to the open position Po. In other words, through the feedback control, the control unit 5 determines the target moving speed according to the position of the opening/closing body 2, and compares the target moving speed and the moving speed of the opening/closing body 2 being obtained through the information from the detecting unit 4 to determine the control value CV to be given to the drive unit 3. The control unit 5 gives the determined control value CV to the drive unit 3. While not shown in FIG. 3, an instruction on the moving direction of the opening/closing body 2 is incorporated into the control value CV and given to the drive unit 3 from the control unit 5, or is given separately from the control value CV to the drive unit 3 from the control unit 5. The drive unit 3 causes the opening/closing body 2 to move toward the open position Po at the speed in accordance with the control value CV.

After the control unit 5 increases the moving speed of the opening/closing body 2 by increasing the control value CV in accordance with the position of the opening/closing body 2, the control unit 5 causes the opening/closing body 2 to move with a constant speed (a speed R1). When the position of the opening/closing body 2 approaches the open position Po, the control unit 5 decreases the control value CV, and thereby the moving speed RS of the opening/closing body 2 decreases. At a time point T11, the opening/closing body 2 comes to a stop at the open position Po, so that the moving speed of the opening/closing body 2 reaches zero, and the control unit 5 provides, for the drive unit 3, the voltage Vo as the control value CV.

When the closing instruction In2 is input at the time point T2, the control unit 5 increases the control value CV from the voltage Vo to move the opening/closing body 2 to the closed position Pc. In other words, the control unit 5 determines the control value CV to be given to the drive unit 3 through an execution of the feedback control, gives the determined control value CV to the drive unit 3, and the drive unit 3 causes the opening/closing body 2 to move toward the closed position Pc with a speed according to the control value CV.

After the control unit 5 increases the moving speed of the opening/closing body 2 by increasing the control value CV in accordance with the position of the opening/closing body 2, the control unit 5 causes the opening/closing body 2 to move with a constant speed (a speed R1). The moving speed RS of the opening/closing body 2 shown in FIG. 3 is an absolute value of the moving speed RS. When the position of the opening/closing body 2 approaches the closed position Pc, the control unit 5 decreases the control value CV, and thereby the moving speed RS of the opening/closing body 2 decreases. The opening/closing body 2 generally comes to a stop at the closed position Pc at a time point T21.

Once the opening/closing body 2 is latched at the closed position Pc, the moving speed of the opening/closing body 2 reaches zero and the control unit 5 provides the voltage Vo as the control value CV to the drive unit 3.

In this way, the feedback control by the control unit 5 makes it possible to move the opening/closing body 2 while controlling the speed to the target moving speed, in accordance with an opening instruction or a closing instruction to be input to the opening/closing body drive mechanism 1. Here, if a failure occurs in the detecting unit 4 or a disconnection occurs in a wiring connecting the detecting unit 4 and the control unit 5, for example, information on the actual moving speed and present position of the opening/closing body 2 cannot be obtained from the detecting unit 4. According to the opening/closing body drive mechanism 1 of the present embodiment, in a case that the information from the detecting unit 4 differs from predetermined information according to the feedback control and the control value CV being given to the drive unit 3 exceeds a predetermined threshold as described above, the control unit 5 determines that the information from the detecting unit 4 is abnormal. Therefore, it is possible to determine easily that abnormality occurs with respect to the detecting unit 4. With continued reference to FIG. 3, determination of abnormality on the information from the detecting unit 4 according to the present embodiment is further described.

Each chart shown in FIG. 3 shows a case in which abnormality occurs in the detecting unit 4 up to the time point T3 after the opening/closing body 2 comes to a stop at the time point T21. In other words, the control value CV to be given to the drive unit 3 is given in the same manner as control at T1 to T11 using the feedback control in response to the input of the opening instructions In1 at the time point T3 such that the target moving speed is achieved. In a case that abnormality occurs in the detecting unit 4, no change occurs with the position PS and the moving speed RS of the opening/closing body 2, which are to be obtained through the information from the detecting unit 4. Therefore, the control unit 5 recognizes that the opening/closing body 2 is not moving at the target moving speed and increases the control value CV to increase the speed of the opening/closing body 2 through the feedback control. In this way, while the feedback control is carried out by the control unit 5, the control unit 5 recognizes that the information from the detecting unit 4 differs from information on, for example, the speed of the opening/closing body 2 to be obtained in accordance with the feedback control.

When the control value CV being given to the drive unit 3 exceeds a predetermined threshold value Vth (a time point T31), the control unit 5 determines that the information from the detecting unit 4 is abnormal. While the control value for the determination of abnormality by the control unit 5 is a voltage value in the present embodiment, it can be a value as a control amount, such as an integrated voltage value, or a value by which the driving state of the drive unit 3 can be indicated. When the control unit 5 determines that the information from the detecting unit 4 is abnormal, the control unit 5 can carry out a process to secure safety with respect to abnormality as a follow control. The process to secure safety with respect to abnormality can be appropriately set in accordance with the use or object of the opening/closing body drive mechanism, so that it can be a process to sound an alarm to report abnormality, can be a process to stop movement of the opening/closing body, or can be a process in which a transition to a safe movement is carried out. In the example in FIG. 3, when the control unit 5 determines that the information from the detecting unit 4 is abnormal, the control unit 5 stops the feedback control and stops the drive unit 3. More specifically, the control unit 5 stops movement of the opening/closing body 2 by providing the voltage Vo as the control value CV for the drive unit 3 to stop the drive unit 3, for example. In this way, it is determined that the information from the detecting unit 4 is abnormal, therefore, it is possible to prevent an inappropriate control value that can cause the opening/closing body 2 to move at high speed from being given to the drive unit 3. While the control unit 5 can monitor the control value CV, by itself, to be compared with the predetermined threshold value Vth, a voltage detector to monitor the control value CV or a detector such as a pulse counter can be provided separately from the control unit 5.

While the predetermined threshold value can be set appropriately in accordance with a control object of the control unit 5, the predetermined threshold value can be set to a voltage value with which driving is carried out to cause a speed at which the movement of the opening/closing body 2 is felt to be abnormal, for example.

The predetermined threshold value does not have to be a value being greater than or equal to the maximum value of the control value CV in a case that no abnormality occurs with respect to the detecting unit 4. For example, in the example in FIG. 3, the predetermined threshold value with respect to the control value CV given to the drive unit 3 is less than the maximum value of the control value CV to be given to the drive unit 3 through the feedback control. As the threshold value is less than the maximum value of the control value CV, abnormality of the detecting unit 4 can be determined while the opening/closing body 2 is moving at a speed at which an observer does not feel any danger. In a case the control unit 5 determines abnormality of the detecting unit 4 at a threshold value being less than the maximum value of the control value CV, control unit 5 can stop the feedback control F to cause the opening/closing body 2 to move at a constant speed as it is.

In the example shown in FIG. 3, based on a determination that the information from the detecting unit 4 is abnormal, the control unit 5 stops the feedback control and stops the opening/closing body 2. However, based on a determination that the information from the detecting unit 4 is abnormal, the control unit 5 can carry out the follow control to apply a voltage corresponding to a predetermined speed of the opening/closing body 2 to the drive unit 3. In the follow control, the opening/closing body 2 moves toward the closed position Pc or the open position Po at the predetermined speed. The follow control is carried out for only a predetermined time, for example. The predetermined speed and the predetermined time are stored in a storage apparatus in the control unit 5, for example, and are read out at the time of the follow control.

Figure 4:
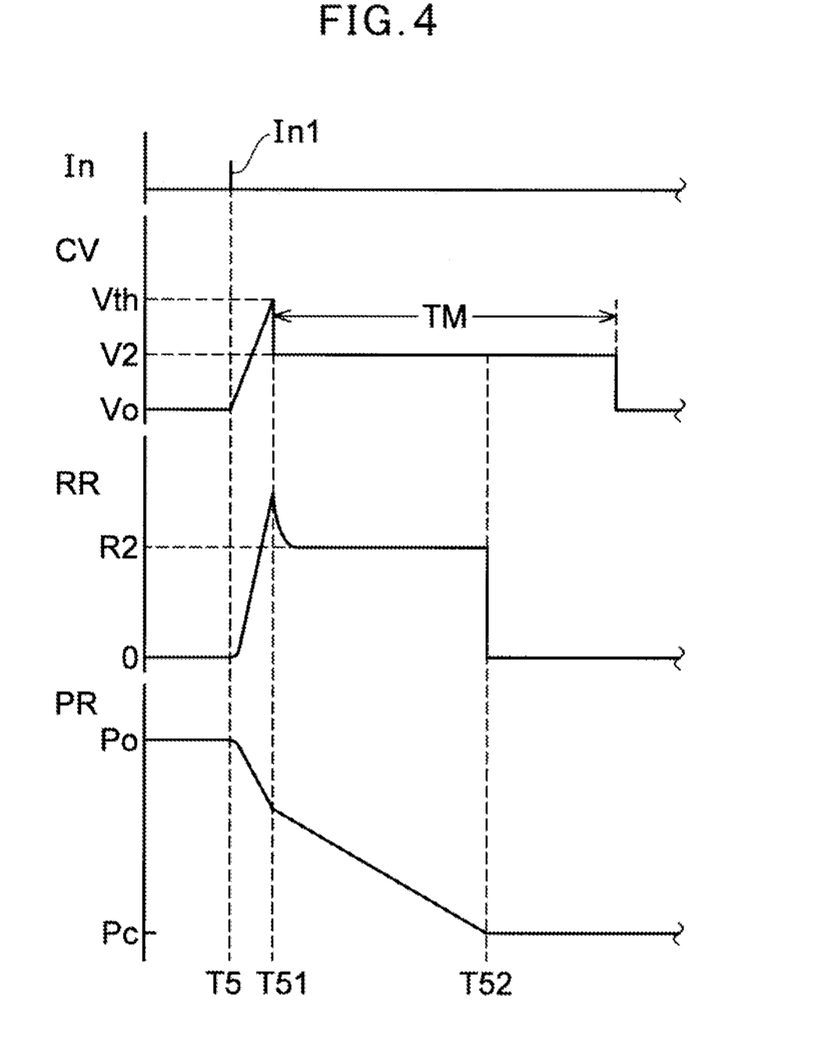
FIG. 4 is a diagram illustrating another example of control at the time of abnormality determination by the opening/closing body drive mechanism according to an embodiment of the invention.

With reference to FIG. 4, the follow control by the opening/closing body drive mechanism 1 is further described. FIG. 4 shows timing charts of one example of each of the control value CV to be given from the control unit 5 to the drive unit 3, an actual moving speed RR of the opening/closing body 2, and an actual position PR of the opening/closing body 2, along with the instruction In to be input to the opening/closing body drive mechanism 1. In the same manner as the example in FIG. 3, a voltage is provided for the drive unit 3 as the control value CV. In the example in FIG. 4, the follow control causes the opening/closing body 2 to move toward the closed position Pc. FIG. 4 is depicted assuming that a situation where the information from the detecting unit 4 is not obtained occurs. Therefore, information according to the actual moving speed RR and the actual position PR of the opening/closing body 2 shown in FIG. 4, is not obtained by the control unit 5.

In the example in FIG. 4, in the period up to a time point T5, the opening/closing body 2 stops at the open position Po. When the opening instruction In is input at the time point T5, the control unit 5 determines the control value CV to be given to the drive unit 3 and increases the control value CV from the voltage Vo, through the feedback control. As shown in FIG. 4, while the opening/closing body 2 moves from the open position Po to the closed position Pc while increasing the moving speed RR in conjunction with an increase in the control value CV, information according to this movement of the opening/closing body 2 is not input to the control unit 5. As the information from the detecting unit 4 differs from the predetermined information according to the feedback control, the control unit 5 determines that the information from the detecting unit 4 is abnormal when the control value CV exceeds the predetermined threshold value Vth at a time point T51.

As shown in FIG. 4, the control unit 5 carries out the follow control based on the determination that the information from the detecting unit 4 is abnormal. In other words, the control unit 5 applies a voltage V2 as the control value CV to the drive unit 3 from the time point T51. The voltage V2 is a voltage corresponding to a predetermined speed R2 of the opening/closing body 2. The voltage V2 is a voltage being suitable for the drive unit 3 to cause the opening/closing body 2 to move at the speed R2, for example. As the speed R2, a harmless speed is set such that the user of the opening/closing body drive mechanism 1 is not harmed even if the user comes into contact with the opening/closing body 2 moving at the speed R2, for example. The speed R2 is a speed being greater than or equal to 5 mm/sec and less than or equal to 10 mm/sec, for example.

The voltage V2 being applied to the drive unit 3 as the control value CV causes the moving speed RR of the opening/closing body 2 to decrease to the speed R2, causing the opening/closing body 2 to move to the closed position Pc at the speed R2 being generally constant. When the opening/closing body 2 reaches the closed position Pc at a time point T52, the opening/closing body 2 comes to a stop at the closed position Pc.

On the other hand, the control unit 5 cannot obtain information on the movement of the opening/closing body 2 from the detecting unit 4, so that the control unit 5 can continue with the follow control, or, in other words, an application, to the drive unit 3, of the voltage V2 as the control value CV without depending on the actual position PR of the opening/closing body 2. Then, as the example in FIG. 4, the follow control can be carried out for a predetermined time TM and, after completing the follow control, the voltage Vo to stop the opening/closing body 2 can be provided for the drive unit 3 as the control value V.

While the predetermined time TM can be set to a time having an arbitrary length, the predetermined time TM can be a time required from the open position Po to the closed position Pc of the opening/closing body 2 moving at the predetermined speed R2, for example. By setting the predetermined time TM in this way, it is possible to move the opening/closing body 2 to the closed position Pc in a generally accurate manner in the follow control without depending on the position of the opening/closing body 2 at the start time of the follow control.

While FIG. 4 shows an example of the follow control causing the opening/closing body 2 to move to the closed position Pc, the control unit 5 can carry out the follow control such as to cause the opening/closing body 2 to move to the open position Po. Moreover, the control unit 5 can determine what control is to be carried out at the time of abnormality determination on the information from the detecting unit 4 based on the information obtained from the detecting unit 4 during the feedback control.

For example, the control unit 5 can determine a control at the time of abnormality determination based on a position (below-called "a final position") of the opening/closing body 2 based on information being finally obtained from the detecting unit 4 prior to the information from the detecting unit 4 differing from the information according to the feedback control. For example, in a case that the final position is the closed position Pc or the open position Po, the opening/closing body 2 can be stopped at the time of abnormality determination. Moreover, in a case that the final position is a position being on the closed position Pc side between the closed position Pc and the open position Po, the control unit 5 can carry out a follow control to cause the opening/closing body 2 to move to the closed position Pc at the time of abnormality determination. Furthermore, in a case that the final position is a position being on the open position Po side between the closed position Pc and the open position Po, the control unit 5 can carry out a follow control to cause the opening/closing body 2 to move to the open position Po at the time of abnormality determination.

[Abnormality Determination Procedure on Information from Detecting Unit]

Figure 5:
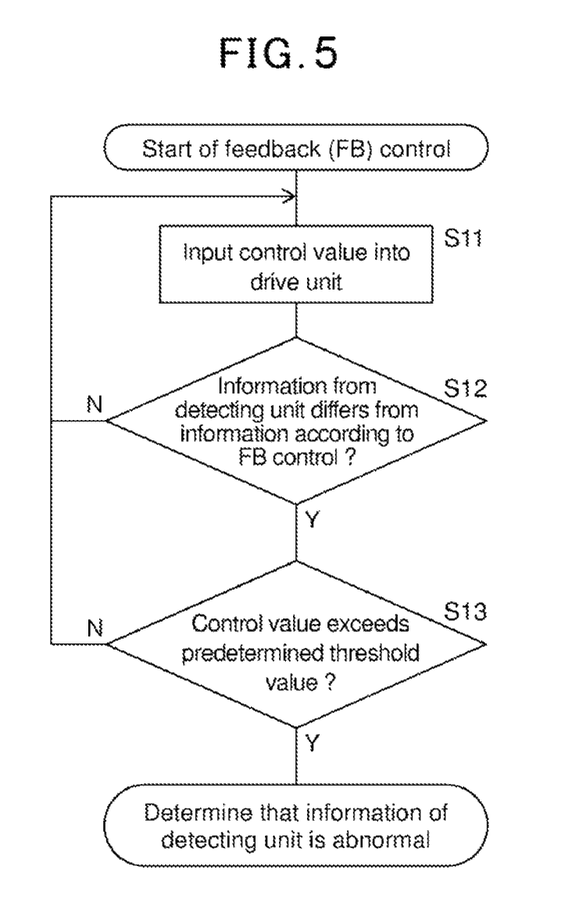
FIG. 5 is a flowchart illustrating an example of an abnormality determination procedure by the opening/closing body drive mechanism according to an embodiment of the invention.

An abnormality determination procedure on information from the detecting unit 4 by the opening/closing body drive mechanism 1 is described with reference to FIG. 5. FIG. 5 is a flowchart showing one example of the abnormality determination procedure by the opening/closing body drive mechanism 1. FIG. 5 corresponds to the control described with reference to FIG. 3.

In the example shown in FIG. 5, after the start of feedback control, control unit 5 input a control value determined based on information from the detecting unit 4 to the drive unit 3 (Step S11). The control unit 5 determines whether the information, on the position of the opening/closing body 2, being obtained from the detecting unit 4 differs from predetermined information according to the feedback control, or, in other words, information to be obtained from the detecting unit 4 in accordance with the control value given to the drive unit 3 by the control unit 5 (Step S12). In a case that determination in Step S12 is negative (N), control by the control unit 5 is returned to Step S11, so that the feedback control is continued. In a case that the determination in Step S12 is affirmative (Y), it is determined, in Step S13, whether the control value given to the drive unit 3 exceeds a predetermined threshold value. In a case that determination in Step S13 is negative (N), control by the control unit 5 is returned to Step S11, so that the feedback control is continued. In a case that the determination in Step S13 is affirmative (Y), it is determined that information of the detecting unit 4 is abnormal.

In the example in FIG. 5, the sequence in which Steps S12 and S13 are executed can be reverse the sequence shown in FIG. 5. Moreover, the determination in Steps S12 and S13 can be carried out a plurality of times. For example, after the affirmative determination in Step S13, the determination in Step S12 can be further carried out as Step S14 (not shown in FIG. 5). Then, in a case that the determination in Step S14 is affirmative, it can be determined that the information from the detecting unit 4 is abnormal. Either one or both of the determinations in Steps S12 and S13 can be executed a plurality of times to reduce an erroneous determination due to an accidental event.

Inputting of the control value into the drive unit 3 in Step S11 is a step that can be executed through the feedback control. Therefore, in a case that the determination in Step S12 and/or S13 is negative, the control by the control unit 5 does not necessarily have to be returned to Step S11, so that it can be returned to Step S12.

The procedure shown in FIG. 5 merely exemplifies the abnormality determination procedure on the information from the detecting unit 4. According to the present embodiment, abnormality determination on the information from the detecting unit 4 can be carried out in any procedure as long as whether the information from the detecting unit 4 differs from the predetermined information according to the feedback control, and whether the control value given to the drive unit 3 exceeds the predetermined threshold value are appropriately determined.

1 Opening/closing body drive mechanism
2 Opening/closing body
3 Drive unit
31 Main body portion
32 Advancing/receding portion
4 Detecting unit
5 Control unit
AR Axial portion
B Vehicular body
B1 Sealing member
C Automobile
CV Control value
F Feedback control
In Instruction to be input to opening/closing body drive mechanism
In1 Opening instruction
In2 Closing instruction
OP Opening
Pc Closed position
Po Open position
PS Position of opening/closing body through information from detecting portion
PR actual position of opening/closing body
RS Moving speed of opening/closing body through information from detecting portion RR Actual moving speed of opening/closing body
R1 Moving speed of opening/closing body
R2 Predetermined moving speed of opening/closing body
Vo Voltage as control value not to move opening/closing body
Vth Predetermined threshold value
V2 Voltage corresponding to predetermined speed
TM Predetermined time
T1-T52 Time point
S11-S13 Step

What is claimed is:

1. An opening and closing body drive mechanism comprising:
   an opening and closing body that moves between an open position in which the opening and closing body opens an opening and a closed position in which the opening and closing body closes the opening, wherein the opening is formed in a mounting object;
   a drive unit to drive the opening and closing body;
   a detecting unit to detect movement of the opening and closing body between the open position and the closed position; and
   a control unit to control a driving of the opening and closing body between the open position and the closed position by the drive unit based on an output of the detecting unit,
   wherein the control unit carries out a feedback control to control the driving of the opening and closing body by the drive unit by applying a control signal to the drive unit such that the movement of the opening and closing body matches a predetermined target value when there is no abnormality in the detecting unit or wiring connecting the detecting unit and the control unit, the control unit receiving the output of the detecting unit; and,
   the control unit determines that the abnormality occurs in the detecting unit or in the wiring, when (a) the movement of the opening and closing body detected by the detecting unit differs from the predetermined target value, and (b) the control signal exceeds a predetermined threshold value.

2. The opening and closing body drive mechanism according to claim 1, wherein the predetermined target value is a predetermined target moving speed for the opening and closing body.

3. The opening and closing body drive mechanism according to claim 1, wherein the control signal is a voltage to be applied to the drive unit.

4. The opening and closing body drive mechanism according to claim 1, wherein when the abnormality occurs in the detecting unit or in the wiring, the control unit stops the feedback control and carries out a follow control, wherein during the follow control, the control unit stops the drive unit or controls the drive unit to drive the opening and closing body at a predetermined speed.

5. The opening and closing body drive mechanism according to claim 4, wherein when the control unit controls the drive unit to drive the opening and closing body at the predetermined speed during the follow control,
   the control unit causes the drive unit to drive the opening and closing body to the closed position when a last-obtained position of the opening and closing body is closer to the closed position than to the open position; and
   the control unit causes the drive unit to drive the opening and closing body to the open position when the last-obtained position of the opening and closing body is closer to the open position than to the closed.

6. The opening and closing body drive mechanism according to claim 1, wherein the predetermined threshold value is less than a maximum value of the control signal to be applied to the drive unit during the feedback control when the abnormality does not occur in the detecting unit or in the wiring.

* * * * *